(12) United States Patent
Katoh

(10) Patent No.: US 6,244,132 B1
(45) Date of Patent: Jun. 12, 2001

(54) SLIDING UNIT WITH SEALING MEANS

(75) Inventor: Masataka Katoh, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 09/300,395

(22) Filed: Apr. 27, 1999

(30) Foreign Application Priority Data

May 11, 1998 (JP) .................................................. 10-142083

(51) Int. Cl.[7] .................................................. F16C 29/08
(52) U.S. Cl. .............................. 74/566; 384/15; 74/89.15
(58) Field of Search ............................... 384/15; 74/608, 74/89.15, 424.8 R, 566; 277/634, 921

(56) References Cited

U.S. PATENT DOCUMENTS

| | | | | |
|---|---|---|---|---|
| 1,431,084 | * | 10/1922 | Anglemyer | 74/566 |
| 4,512,208 | * | 4/1985 | Lipinski et al. | 74/89.15 |
| 4,706,510 | * | 11/1987 | Zimmer | 384/15 |
| 5,590,580 | * | 1/1997 | Nagi | 74/89.15 |

FOREIGN PATENT DOCUMENTS 11-030234   2/1999   (JP) .

* cited by examiner

Primary Examiner—David A. Bucci
Assistant Examiner—William C Joyce
(74) Attorney, Agent, or Firm—Browdy and Neimark

(57) ABSTRACT

A sliding unit having sealing means for closing gaps between a track rail and a dustproof cover. The sealing means is comprised of flexible sealing members that permit flanges for mounting an object on a sliding element to move through the sealing means. The sliding element moving on the track rail is provided on the side surfaces thereof with the flanges extending laterally through the gaps between the dustproof cover and side walls of the track rail. The flexible sealing members are arranged at the widthwise-opposing sides of the track rail so as to close the gaps, resulting in keeping the sliding unit from the contamination of foreign bodies such as dust and dirt. The flexible sealing members are composed of chains. The lateral extensions of the flanges may move smoothly through the gaps between the chains and the side walls of track rail while the chains close the gaps constantly whenever the flanges move along the track rail.

14 Claims, 5 Drawing Sheets

SLIDING UNIT WITH SEALING MEANS

BACKGROUND OF THE INVENTION

1. Field of the Invention

The present invention relates to a sliding unit adapted for use in, for example, machine tools, assembly machine, testing instruments or the like, and more particularly a sliding unit having sealing means for keeping relatively sliding regions from the contamination of foreign materials such as dust and dirt.

2. Description of the Prior Art

The recently remarkable development in mechatronics technology requires increasingly the general-purpose sliding units. Although the sliding means or units have been now employed extensively in various fields such as machine tools, semiconductor manufacturing apparatus, transportation apparatus, industrial robots and the like, the need of the sliding units extends into many technical fields. With the expansion of uses, the sliding units become required more and more to deal with the precision, high-speed moving, easy assemblage, wide applicability and the like.

The sliding unit is in general comprised of a track rail mounted on a machine bed or the like, a sliding element such as a workpiece table movable along the track rail, and a driving mechanism for moving linearly the sliding element on the track rail. The driving mechanism is, for example, comprised of a screw shaft drivingly mating with a screw nut fixed to the sliding element, supporting brackets for bearing the screw shaft at its lengthwise opposing ends, and driving means such as a motor mounted to any one of the supporting brackets so as to rotate the screw shaft. On the sliding units of the type described above, the sliding element, or the slider, may be either positioned on the track rail or guided along the track rail by electrically controlling the driving means.

Shown in FIGS. 7 to 9 is the sliding unit disclosed in Japanese Patent Laid-Open No. 30234/1999.

The sliding unit 1 in FIGS. 7 to 9 is primarily comprised of an elongated track rail 2 having an U-shaped traverse cross-section, a sliding element 3 movably accommodated in an U-shaped recess 5 of the track rail 2, a screw shaft 4 mating with the sliding element 3, and a driving motor 9 for rotating the screw shaft 4. The screw shaft 4 is supported for rotation in first and second bearing members 11, 12 at the lengthwise opposing ends of the track rail 2. The motor 9 is mounted to the first bearing member 11 near the motor and the track rail 2 is fixed to a base by means of any suitable means such as screws. The sliding element 3 is constructed so as to move linearly on the track rail 2 through, for example, rolling elements running between the sliding element and the track rail. A bottom 6 and a pair of upright side walls 7 define in combination the recess 5 in the track rail 2. The side walls 7 are provided on their widthwise opposing inner surfaces 33 with raceway grooves 8 that extend in parallel with each other lengthwise along the track rail while the sliding element 3 has raceway grooves, not shown, confronting the raceway grooves 8. Rolling elements may run through raceways, which are defined between the raceway grooves 8 on the side walls 7 and the raceway grooves on the sliding element, thereby making the sliding element 3 move smoothly on the track rail 2. In addition, the casing of the sliding element 3 includes therein return-paths for endless circulation of the rolling elements.

The sliding element 3 has a pair of widthwise opposing upright flanges 10, which are to mount an object such as a workpiece table, not shown, on the sliding element. The flanges 10 are formed with threaded holes 14 for fixture means such as screws to mount the workpiece table or the like on the flanges. In order to protect the sliding element 3 and the screw shaft 4 in the track rail 2 from foreign bodies, a dustproof cover 15 is attached to the bearing members 11, 12 by means of fixing bolts so as to cover over the sliding element 3 and the screw shaft 4 accommodated in the track rail 2. The dustproof cover 15 is further formed with matching holes 16 in alignment with the locations where the fixing bolts are driven. The flanges 10 on the sliding element 3, on which the object to be moved is loaded, are formed so as to unobstructively face the dustproof cover 15. To this end, the flanges 10 each extend widthwise outwardly of the track rail 2 and then turn upwardly to thereby provide a substantially L-shape in front view. The object such as a workpiece table is mounted on the flanges 10 with bolts that fit in matching holes 14. As will be seen from the foregoing, relatively moving the sliding element 3 to the track rail 2 causes the object to traverse with respect to the base.

Fixed to the sliding element 3 with screws 18 is a nut 17 formed with an internal helical groove that mates with an external helical groove provided around the periphery of the screw shaft 4. The combination of the screw shaft 4 with the nut 17 constitute a torque-to-thrust conversion mechanism in which the rotation of the axially fixed screw shaft 4 results in driving linearly the rotationally fixed nut 17 along the track rail 2. To help ensure the reliable smooth linear movement of the sliding element 3 in the sliding unit 1, rolling elements are loaded so as to run between the confronting helical grooves, not shown, of the screw shaft and the nut whereby the torque-to-thrust conversion mechanism is designed as a ball nut and screw shaft assembly, which is comprised of the screw shaft 4, nut 17 and circulating rolling elements.

Fixed on railheads 20 of the side walls 7 in the track rail 2 with screws are bearing members 11, 12 that support the screw shaft 4 for rotation at its lengthwise ends. The raceway grooves 8 and the railheads 20 in the track rail 2 are finished in parallel with each other. Therefore, simply fixing the bearing members 11, 12 on the railheads 20 of the track rail 2 with horizontal position alignment may be sufficient to arrange the screw shaft 4 on the track rail 2 in the sliding element 3 in accurate alignment with the moving direction of the sliding element 3, with no necessity of vertical position adjustment.

Sensor rails 21 are disposed widthwise outwardly of the side walls 7 of the track rail 2 and bolted at 22. Sensors 23 are arranged on the sensor rails 21 at positions that are to be identified such as the beginning. Signals issued from the sensors 23 that have detected the flanges 13 are input to a controller unit, not shown, through a lead wire 24 and a sensor connector 25 and then control signals from the controller unit are applied to the motor 9 such as a stepping motor.

The sensor rails 21 are each provided therein with a furrow 26 extending along the lengthwise direction of the rail, in which may be kept the lead wire 24. Further, the sensor rails 21 form side covers 27 to shield the track rail 2 and the sliding element 3 on their widthwise-opposing sides. Formed at the bottom 6 of the track rail 2 are holes 29 matching with bolts to fix the track rail 2 onto the base, not shown. The holes 29 are bored in tow rows and spaced apart from each other with a predetermined distance. The torque of the motor 9 is transmitted to the screw shaft 4 through a coupling 30. The permissible span of the reciprocating movement to the sliding element 3 is defined with stoppers 31, 32 that are secured to the bearing members 11, 12, one to each bearing member.

In the meantime, as the flanges 10 on which the workpiece table is to be mounted move integrally with the sliding element 3, the sliding unit 1 of the type as described above is necessarily provided with gaps or clearances L for permitting the movement of the flanges 10 therethrough. Although the sensor rails 21 constitute the side covers 27 that partly conceal the relatively sliding region, no design is proposed for substantially completely shield the gaps or clearances L and, therefore, the prior art makes it impossible to keep completely the sliding unit 1 from foreign bodies that invade into the driving mechanism through the gaps or clearances L.

To cope with the antinomic problem in the prior sliding unit, wherein the flanges are allowed to move unobstructively while the interior of the sliding unit may be effectively purged of the invasion of foreign bodies such as dust and dirt, the inventor has considered employing a flexible sealing members that close normally the gaps open between the dustproof cover and the track rail, but may be flexibly deformed so as to form slits for permitting the movement of the flanges, on which the object is to be mounted, with the passage of the flanges.

SUMMARY OF THE INVENTION

The present invention, therefore, has as its primary object to overcome the problem as described just above and more particular to provide, in an sliding unit having a sliding element that is provided on the widthwise opposing sides thereof with flanges for supporting thereon an object, and the flanges laterally extending through gaps or clearances between the track rail and the dustproof cover, the improvement wherein flexible sealing members deformable by the action of the flanges close the gaps or clearances to thereby protect the sliding element and the track rail from the invasion of foreign bodies such as dust and dirt.

The present invention is concerned with a sliding unit with sealing means, comprising a track rail having a pair of lengthwise side walls opposing to each other widthwise of the tack rail, a sliding element movable on the track rail, a dustproof cover arranged extending lengthwise of the track rail over both the track rail and sliding element, flanges for supporting thereon an object to be loaded on the sliding element, the flanges being formed integrally with the sliding element so as to extend through gaps between the confronting surfaces of the dustproof cover and the side walls of the track rail, and flexible sealing members lying down on the side walls of the track rail so as to close the gaps, whereby the flexible sealing members are subject to the flexible deformation so as to be spaced apart from the side walls by the flanges that pass through the gaps on the movement of the sliding element along the track rail.

In one aspect of the present invention, the flanges moving on the track rail are spaced apart from the side walls of the track rail by small clearances.

In another aspect of the present invention, the flexible sealing members are each comprised of any one of a chain, belt and string. This makes it possible to produce simply and inexpensively the flexible sealing members by the use of machine parts for the gearing such as chains, with the result of the production cost-saving of the sliding unit.

In another aspect of the present invention, the flanges running in sliding contact with undersides of the flexible sealing members each have an upper surface of convex composed of a horizontal plane and inclined planes that are merged with the horizontal plane at fore-and-aft ends thereof and tapered towards the opposing ends in the moving direction of the flanges.

In a further another aspect of the present invention, the dustproof cover has sidewise aprons extending laterally of side surfaces of the sliding element over the flexible sealing members, and depending panels extending downwards from the outermost edges of the sidewise aprons.

In another aspect of the present invention, a sliding unit with sealing means is disclosed wherein flexibly deformed portions of the flexible sealing members are retracted in compartments defined by the sidewise aprons and depending panels of the dustproof cover and the side surfaces of the sliding element.

In another aspect of the present invention, the sliding element has the tension bars for guiding the flexible sealing members towards on the side walls of the track rail.

In another aspect of the present invention, the tension bars have any one of sprockets, pulleys, leaf springs and pads.

According to the sliding unit constructed as described above, the flexible sealing members lying down on the side walls of the track rail may close the gaps between the railheads of the side walls in the track rail and the depending panels of the dustproof cover, except for the areas where the flanges are present, thereby protecting the interior of the sliding unit from the invasion of the foreign bodies such as dust and dirt.

Moreover, the flexible sealing members are subject to the flexible deformation so as to be spaced apart from the side walls by the flanges that pass through the gaps on the movement of the sliding element along the track rail, so that the flanges may move through the gaps with no obstruction owing to the sealing members.

The above and other related objects and features of the present invention will be more apparent to those skilled in the art from a reading of the following description of the disclosure found in the accompanying drawings and the novelty thereof pointed out in the appended claims.

DETAILED DESCRIPTION OF THE PREFERRED EMBODIMENTS

Figure 1:
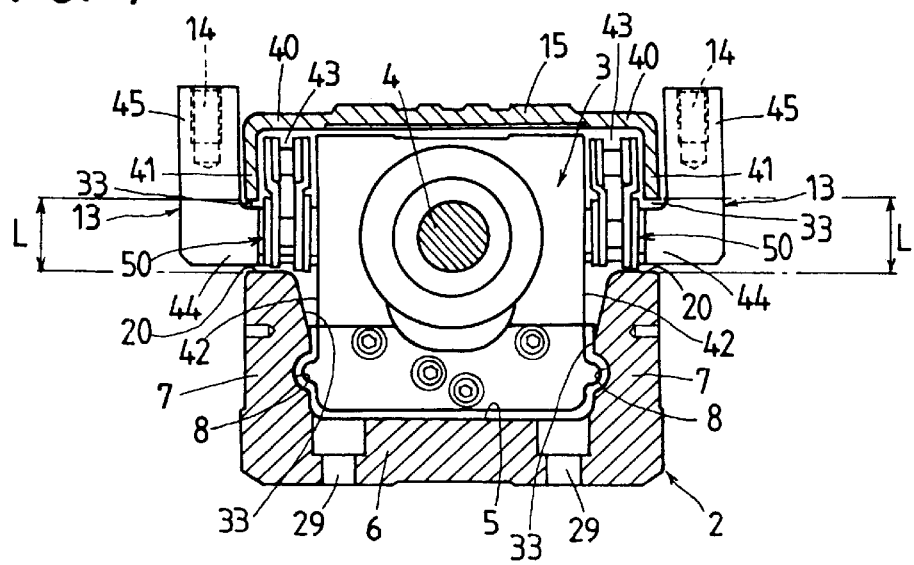
FIG. 1 is a traverse cross section showing a preferred embodiment of a sliding unit having sealing means according to the present invention.
Figure 2:
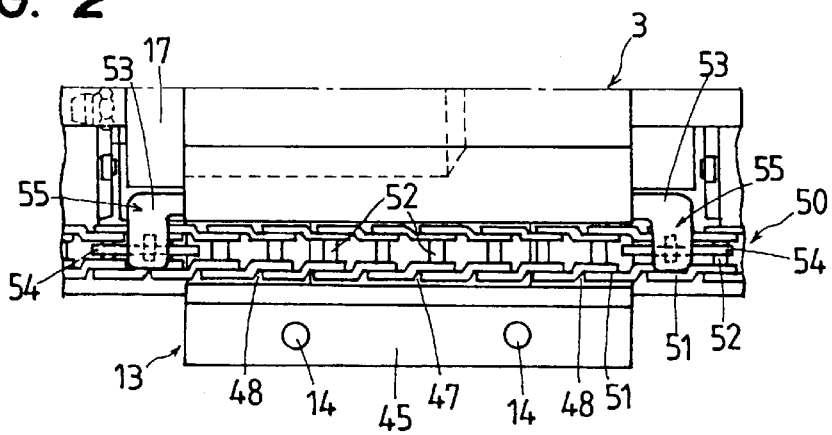
FIG. 2 is a partial top plan view of the sliding unit shown in FIG. 1, but in which a dustproof cover is removed.
Figure 3:
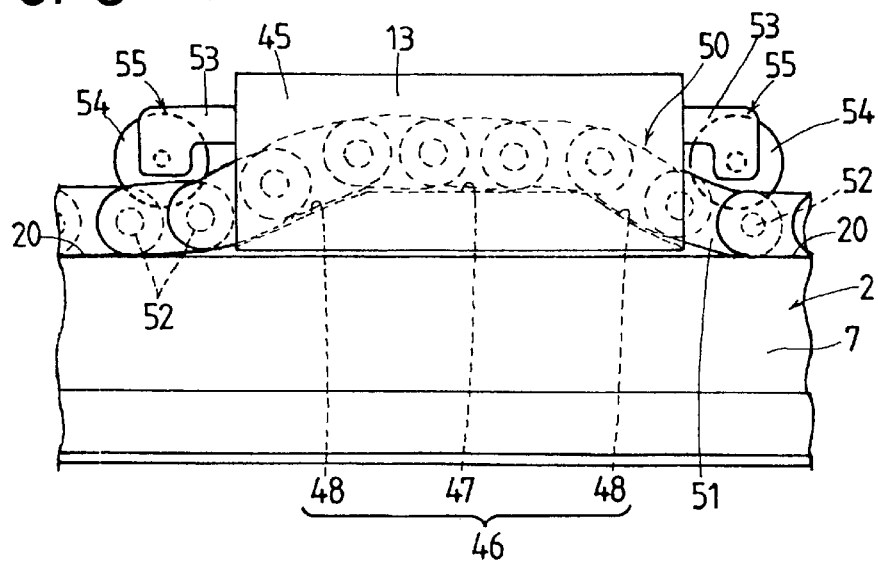
FIG. 3 is a partial side elevation of the sliding unit shown in FIG. 1, but in which a dustproof cover is removed.
Figure 4:
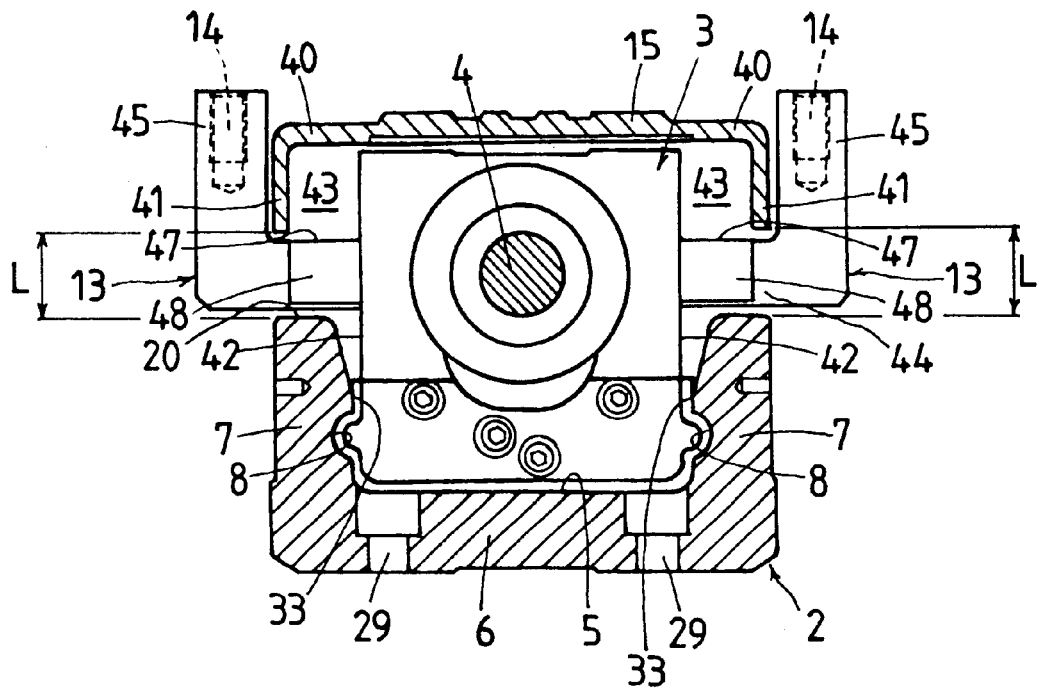
FIG. 4 is a traverse cross section showing a sliding unit shown in FIG. 1, but in which flexible sealing members are removed.
Figure 5:
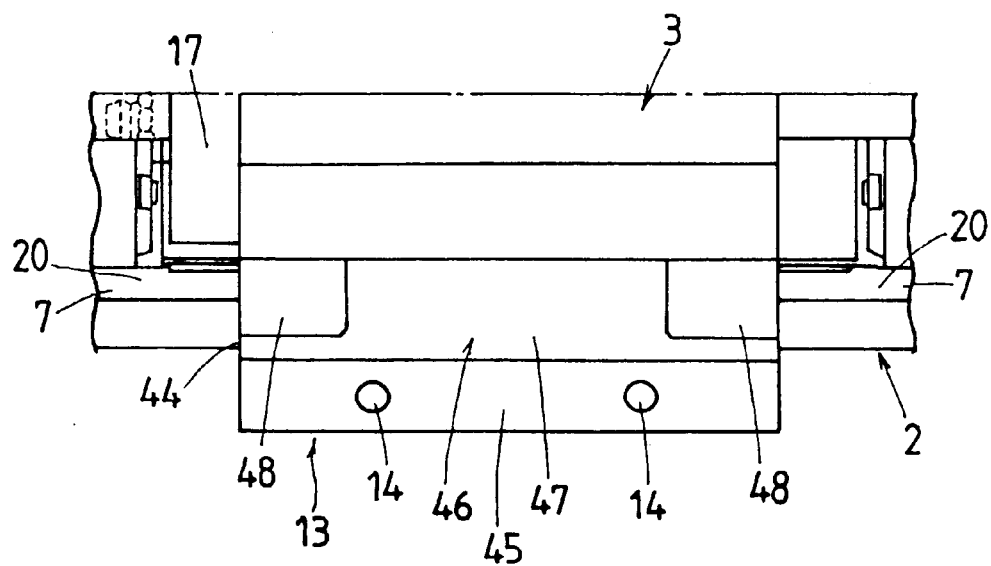
FIG. 5 is a partial top plan view of the sliding unit shown in FIG. 2, but in which the flexible sealing member is removed.
Figure 6:
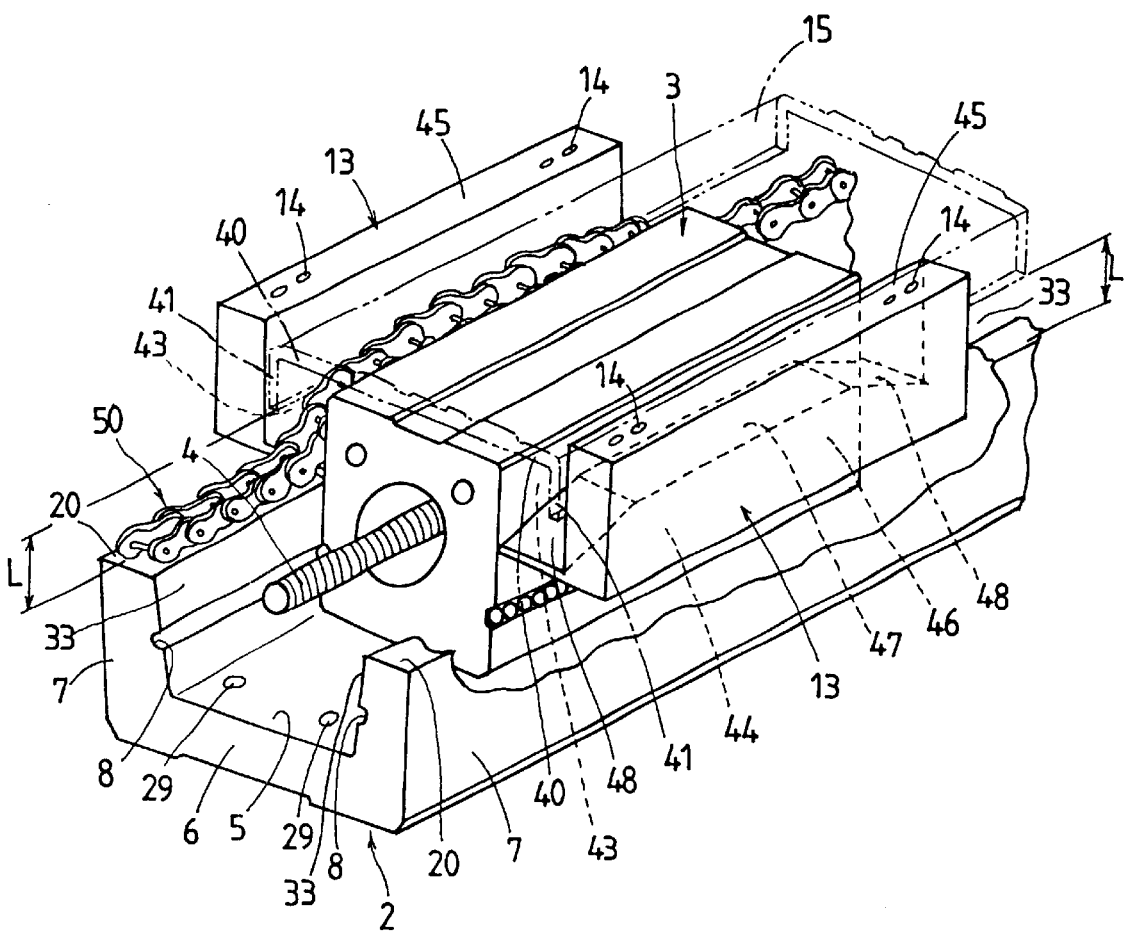
FIG. 6 is a schematic perspective view, partially broken away, of the sliding unit shown in FIG. 5, parts including the dustproof cover are omitted.
Figure 7:
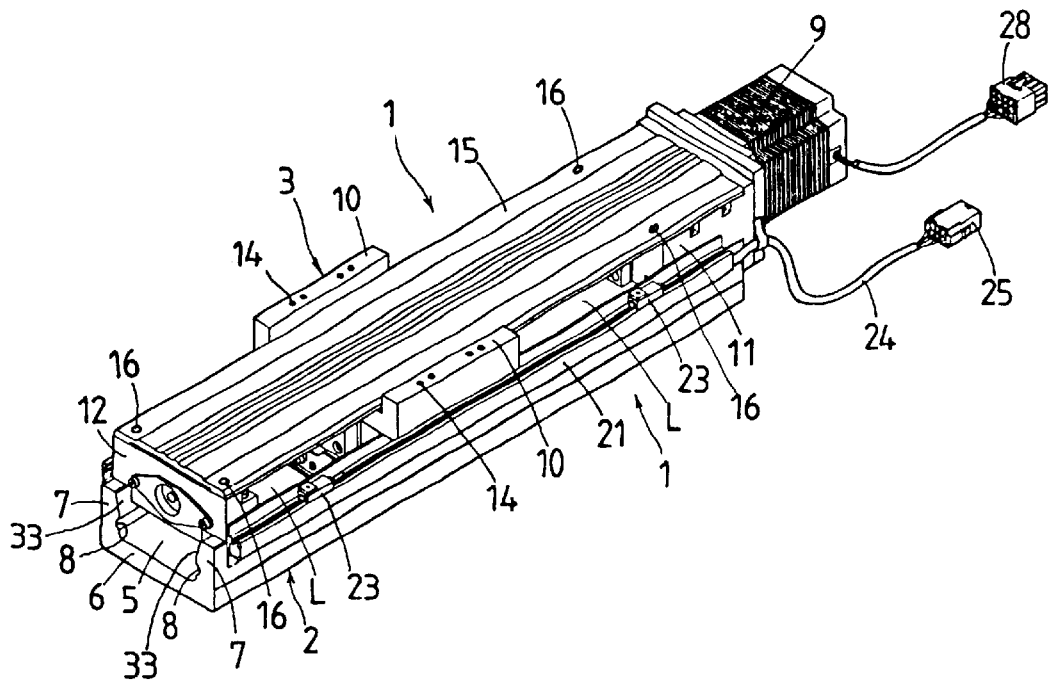
FIG. 7 is a perspective view of the sliding unit disclosed in the co-pending prior application in Japan, but in which a dustproof cover is incorporated.
Figure 8:
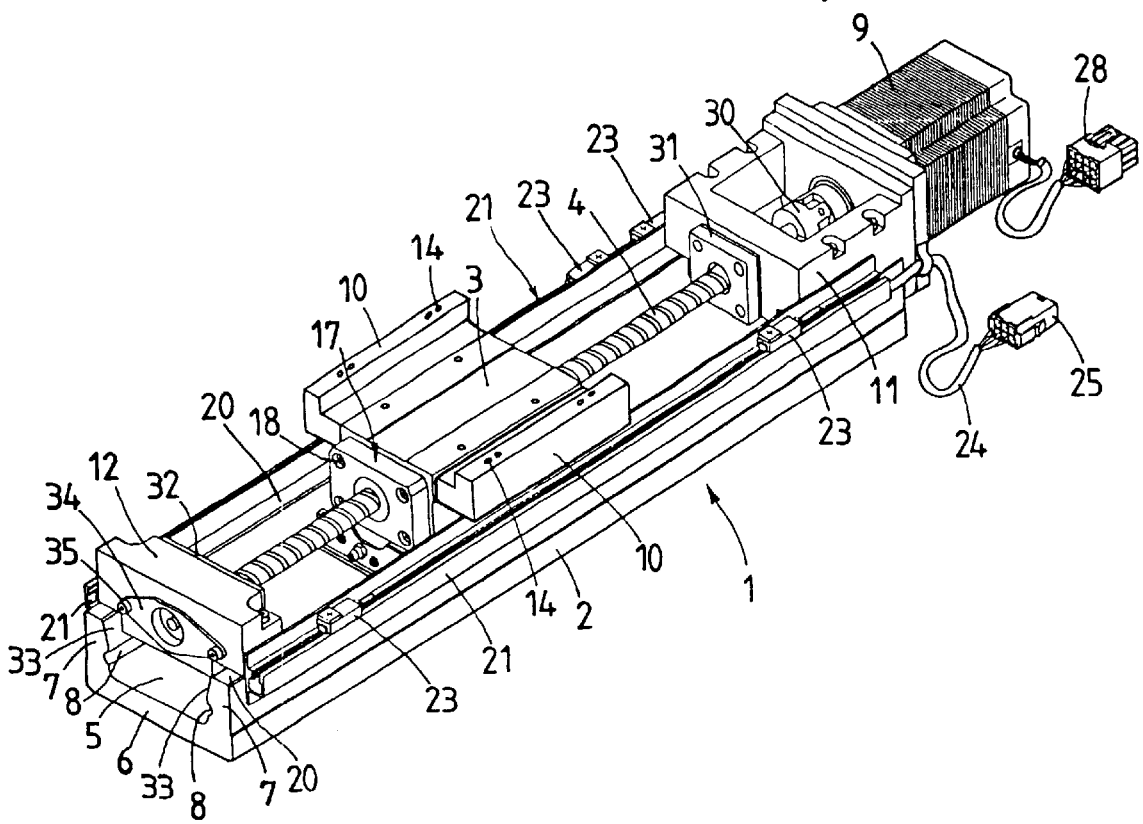
FIG. 8 is a perspective view of the sliding unit shown in FIG. 7, but in which the dustproof cover is removed.
Figure 9:
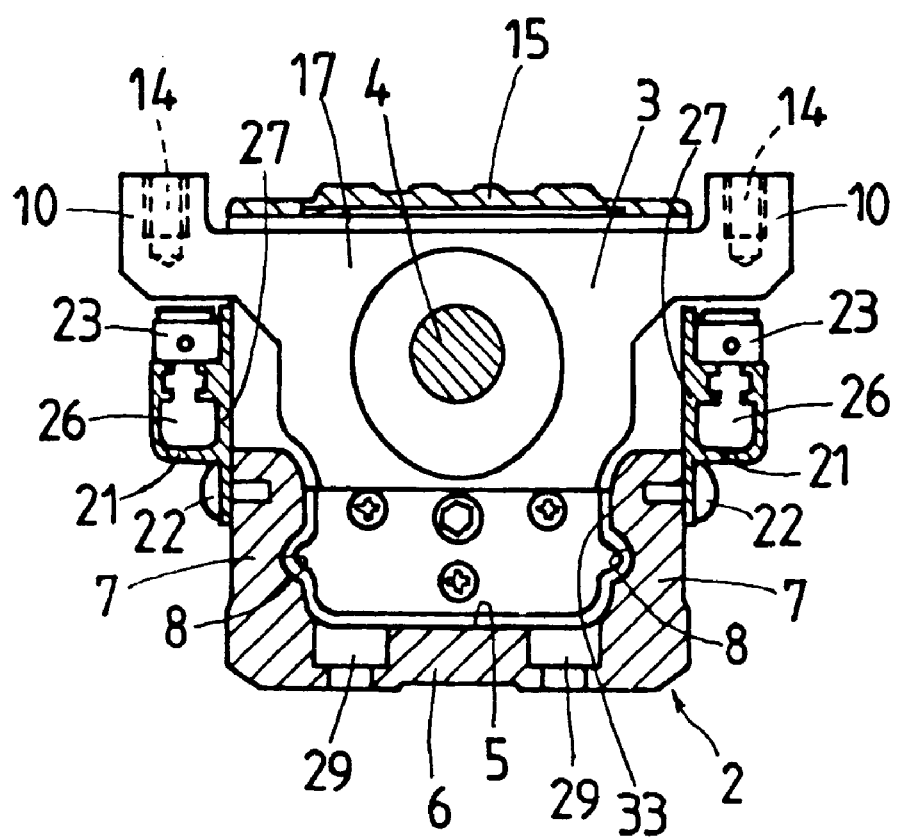
FIG. 9 is a traverse cross-sectional view of the sliding unit shown in FIG. 7, the view being taken in perpendicular to the screw shaft on any plane between a sliding element and a bearing member for the screw shaft.

A preferred embodiment of a sliding unit having sliding means according to the present invention will be explained hereinafter in detail with reference to the accompanying drawings. The sliding unit in FIGS. 1 to 6 is substantially the same as the sliding unit previously described in reference to FIGS. 7 to 9. To that extent, the same reference character identifies equivalent or same components in the sliding unit described above, so that the previous description will be applicable.

Now referring to FIGS. 1 to 6, the elongated track rail 2 has an U-shaped traverse cross-section that is defined by the bottom 6 and the widthwise-opposing upright side walls 7. The sliding element 3 is accommodated for sliding movement along the track rail 2 in the recess 5 defined with the side walls 7 and protrudes partially over railheads 20 of the side walls 7. The dustproof cover 15 is arranged over the sliding element 3 and the track rail 2 to protect them from the contamination of the foreign bodies such as dust and dirt and fixed to the bearing members 11, 12 that are secured to the track rail 2 for supporting the screw shaft. The dustproof cover 15, moreover, has sidewise aprons 40 extending laterally beyond the width of the sliding element 3, and depending panels 41 extending downwards from the outermost edges of the sidewise aprons 40.

The flanges 13 for supporting thereon the object such as a workpiece table extend widthwise from side surfaces 42 of the sliding element 3. The flanges 13 each have a lateral extension 44 extending widthwise outwardly of the sliding element 3, and an upright projection 45 turning upwardly at the extremity of the extension 44 and then elongating over the dustproof cover 15 in parallel with the depending panel 41 at the lateral outside of the depending panel 41. In accordance with the design as described just above, there are provided compartments 43 extending along the moving direction of the sliding element 3, each of which is defined by the horizontally opposing depending panel 41 of the dustproof cover 15 and side surface 42 of the sliding element 3 as well as the vertically opposing sidewise apron 40 and lateral extension 44. The lateral extensions 44, as seen from FIG. 3, each have an upper surface 46 that has at a midway region a horizontal plane 47 parallel with and above the railhead 20 of the associated side wall 7 of the track rail 2 while at its fore-and-aft end regions has inclined planes 48 merging with the horizontal plane 47 and slantwise extending with respect to the moving direction of the sliding element 3. Moreover, the inclined planes 48 are designed so as to merge with the railheads 20 of the side walls 7 in the track rail 2 at a moderate slantwise angle.

Chains 50 serving as the flexible sealing members lie on the railheads 20 of the side walls 7 in the track rail 2 as well as the horizontal planes 47 and inclined planes 47 of the sliding elements 3. The chains 50 are fixed at their opposing terminals to the track rail 2 by any suitable fixture means. As an alternative, the chains 50 may be anchored to the track rail 2 through springs to buffer the excessive force exerting accidentally on the chains. It will be noted that the chains 50 lie down on the railheads 20 of the side walls 7 in the track rail 2 and the horizontal planes 47 and inclined planes 47 of the sliding elements 3 with substantially no slack therein. Moreover, the chains 50 are simply put on the railheads 20 of the side walls 7 in the track rail 2 with no fixing to the track rail 2 except that they are anchored at their ends to the track rail 2. The chains 50 for the flexible sealing members are each composed of link plates 51 and pins 52, which are connected one after another so that the link plates 51 rotate around the pins 52, thereby providing bending or flexibility. Each link plate 51 in the chains 50 has a height that is somewhat greater the width of gaps L between the railheads 20 of the side walls 7 in the track rail 2 and the lowest edges of the depending panels 41 of the dustproof cover 15 so as to close the gaps L.

The sliding element 3 is provided at its fore-and-aft ends with arms 53 extending above the chains 50 lying down on the railheads 20 of the side walls 7 in the track rail 2. Mounted on the free ends of the arms 53 are tension bars 55 that support thereon tension pulleys 54 making rolling contact with the pins 52 of the chains 50. The tension bars 55 are to press down the pins 52 of the chains 50 against the track rail 2 and therefore, during the sliding element 3 moves on the track rail 2, the chains 50 may be kept from bounding on the movement of the flanges 13 along the inclined planes 48, so that the tension bars 55 may help ensure the smooth movement of the chains 50 at the transition phase from the inclined planes 48 to the horizontal planes 47 and vice versa. It will be thus understood that the tension bars 55 are urged against the railheads 20 of the side walls 7 in the track rail 2 by elastic means such as springs, not shown.

According to the sliding unit constructed as described just above, the chains 50 for the flexible sealing members, with the movement of the sliding element 3 along the track rail 2, are spaced apart from the railheads 20 of the side walls 7 in the track rail 2 by virtue of the leading inclined planes 48 on the upper surfaces 46 of the sliding element 3. After having gone past the leading inclined planes 48, horizontal planes 47 and the trailing inclined planes 48 of the flanges 13 on the movement of the sliding element, the chains 50 return to such event that they lie down on the railheads 20 of the side walls 7 in the track rail 2. The chains 50 on the horizontal planes 47 are retracted in the compartments 43 with no interference with the dustproof cover 15. The chains 50 may close the gaps L between the railheads 20 of the side walls 7 in the track rail 2 and the depending panels 41 of the dustproof cover 15 except for the areas where the flanges 13 are present, thereby protecting the interior of the sliding unit from the invasion of the foreign bodies such as dust and dirt. The flanges 13 moving on the track rail 2 are spaced apart from the railheads 20 of the side walls 7 in the track rail 2 by clearances so small as efficient to purge the interior of the sliding unit of foreign bodies dust and dirt. Hence, the sliding unit of this invention makes it possible to keep the interior of the sliding unit from the foreign bodies such as dust and dirt, which might otherwise contaminate the sliding unit through the gaps L left between the railheads 20 of the side walls 7 in the track rail 2 and the depending panels 41 of the dustproof cover 15.

Although the flexible sealing members in the embodiment described above are formed from the chains 50, elongated members such as belts or strings may be equally employed. Moreover, the upper surfaces 46 of the flanges 13 for guiding the chains thereon may be each formed in a smooth convex surface, instead of the trapezoidal convex including the inclined planes 48 and the horizontal plane 47. For making the smooth movement of the flanges relatively of the flexible sealing members, the upper surfaces 46 of the flanges may be applied with antifriction material or provided with rows of rotatable rollers such as roller ways. In connection with the tension bars 53, sprockets meshing with the pins 52 may be substituted for the tension pulleys 54. As an alternative, sliding pads may be employed that are urged against the chains 50 by the action of leaf springs or elastic members, which force the chains 50 towards the railheads 20 of the side walls 7 in the track rail 2 or the inclined planes 48 of the flanges 13.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A sliding unit with sealing means, comprising a track rail having a pair of lengthwise side walls opposing to each other widthwise of the track rail, a sliding element moveable on the track rail, a dustproof cover arranged extending lengthwise of the track rail over both the track rail and sliding element, flanges for supporting thereon an object to be loaded on the sliding element, the flanges being formed integrally with the sliding element so as to extend through gaps between confronting surfaces of the dustproof cover and the side walls of the track rail, and flexible sealing members lying on the side walls of the track rail so as to close the gaps, whereby the flexible sealing members are subject to flexible deformation so as to be spaced apart from the side walls by the flanges that pass through the gaps on the movement of the sliding element along the track rail, wherein the flexible sealing members are each comprised of any one of a chain, belt and string.

2. A sliding unit with sealing means, constructed as defined in claim 1 wherein the flanges moving on the track rail are spaced apart from the side walls of the track rail by clearances.

3. A sliding unit with sealing means, constructed as defined in claim 1 wherein lateral extensions of the flanges, which run in sliding contact with undersides of the flexible sealing members, each have an upper surface composed of a horizontal plane and inclined planes that merge with the horizontal plane at fore-and-aft ends of the lateral extensions and taper towards the track rail.

4. A sliding unit with sealing means, constructed as defined in claim 1 wherein the dustproof cover has sidewise aprons extending laterally of side surfaces of the sliding element over the flexible sealing members, and depending panels extending downwards from the outermost edges of the sidewise aprons.

5. A sliding unit with sealing means, constructed as defined in claim 4 wherein flexibly deformed portions of the flexible sealing members are retracted in compartments defined by the sidewise aprons and depending panels of the dustproof cover and the side surfaces of the sliding element.

6. A sliding unit with sealing means, constructed as defined in claim 1 wherein the sliding element has tension bars for guiding the flexible sealing members towards the side walls of the track rail. sealing means, constructed.

7. A sliding unit with sealing means, constructed as defined in claim 6 wherein the tension bars have any one of sprockets, pulleys, leaf springs and pads.

8. A sliding unit with sealing means, comprising a track rail having a pair of lengthwise side walls opposing to each other widthwise of the track rail, a sliding element movable on the track rail, a dustproof cover arranged extending lengthwise of the track rail over both the track rail and sliding element, flanges for supporting thereon an object to be loaded on the sliding element, the flanges being formed integrally with the sliding element so as to extend through gaps between confronting surfaces of the dustproof cover and the side walls of the track rail, and flexible sealing members lying on the side walls of the track rail so as to close the gaps, whereby the flexible sealing members are subject to flexible deformation so as to be spaced apart from the side walls by the flanges that pass through the gaps on the movement of the sliding element along the track rail, wherein the dustproof cover has sidewise aprons extending laterally of side surfaces of the sliding element over the flexible sealing members, and depending panels extending downwards from the outermost edges of the sidewise aprons.

9. A sliding unit with sealing means, constructed as defined in claim 8 wherein the flexible sealing members are each comprised of any one of a chain, belt and string.

10. A sliding unit with sealing means, constructed as defined in claim 8 wherein lateral extensions of the flanges, which run in sliding contact with undersides of the flexible sealing members, each have an upper surface composed of a horizontal plane and inclined planes that merge with the horizontal plane at fore-and-aft ends of each of the lateral extensions and taper towards the track rail.

11. A sliding unit with sealing means, constructed as defined in claim 8 wherein flexibly deformed portions of the flexible sealing members are retracted in compartments defined by the sidewise aprons and depending panels of the dustproof cover and the side surfaces of the sliding element.

12. A sliding unit with sealing means, constructed as defined in claim 8 wherein the sliding element has tension bars for guiding the flexible sealing members towards the side walls of the track rail.

13. A sliding unit with sealing means, constructed as defined in claim 12 wherein the tension bars have any one of sprockets, pulleys, leaf springs and pads.

14. A sliding unit with sealing means, constructed as defined in claim 8 wherein the flanges moving on the track rail are spaced apart from the side walls of the track rail by clearances.

* * * * *